US012353502B2

(12) United States Patent
Kantor et al.

(10) Patent No.: US 12,353,502 B2
(45) Date of Patent: Jul. 8, 2025

(54) OPTIMIZING COMBINED SENSORY DATA BY UTILITARIAN SELECTION OF A SUBGROUP OF AVAILABLE SENSORS

(71) Applicant: International Business Machines Corporation, Armonk, NY (US)

(72) Inventors: Amir Kantor, Haifa (IL); Michael Masin, Haifa (IL); Segev Shlomov, Haifa (IL); Rotem Dror, Mattat (IL)

(73) Assignee: International Business Machines Corporation, Armonk, NY (US)

( * ) Notice: Subject to any disclaimer, the term of this patent is extended or adjusted under 35 U.S.C. 154(b) by 1494 days.

(21) Appl. No.: 15/905,988

(22) Filed: Feb. 27, 2018

(65) Prior Publication Data

US 2019/0266215 A1    Aug. 29, 2019

(51) Int. Cl.
*G06N 5/045* (2023.01)
*G06F 17/16* (2006.01)
*G06F 17/18* (2006.01)

(52) U.S. Cl.
CPC ............ *G06F 17/16* (2013.01); *G06F 17/18* (2013.01); *G06N 5/045* (2013.01)

(58) Field of Classification Search
CPC ......... G06F 17/16; G06F 17/18; G06N 5/045; G06N 5/003; G06Q 10/00
See application file for complete search history.

(56) References Cited

U.S. PATENT DOCUMENTS

| | | | |
|---|---|---|---|
| 8,898,042 B2 | 11/2014 | Stander | |
| 2004/0220837 A1* | 11/2004 | Bonissone | G06Q 40/08 705/4 |
| 2008/0065359 A1* | 3/2008 | Rudolph | G06F 30/20 703/2 |
| 2012/0323343 A1* | 12/2012 | Grichnik | G05B 23/0235 703/2 |

(Continued)

OTHER PUBLICATIONS

Tekiner, Hatice, David W. Coit, and Frank A. Felder. "Multi-period multi-objective electricity generation expansion planning problem with Monte-Carlo simulation." Electric Power Systems Research 80.12 (2010): 1394-1405. (Year: 2010).*

(Continued)

*Primary Examiner* — Michael J Huntley
*Assistant Examiner* — Sehwan Kim
(74) *Attorney, Agent, or Firm* — CHIP LAW GROUP

(57) ABSTRACT

A method comprising using at least one hardware processor for receiving sensory data from at least one physical or virtual sensor. The hardware processor(s) are used for computing a plurality of decision options for configuration of the at least one physical or virtual sensor. The hardware processor(s) are used for computing a plurality of utility functions, and for each utility function: (a) computing a utility value for each decision option, and (b) identifying a first subset of decision options that substantially maximize the computed utility values. The hardware processor(s) are used for selecting at least one cross-function decision option from of the first subsets, wherein the at least one cross-function (Continued)

decision option is included in a substantially maximum number of the first subsets. The hardware processor(s) are used for applying at least one of the at least one cross-function decision options, to at least one physical or virtual sensor.

10 Claims, 2 Drawing Sheets

(56) References Cited

U.S. PATENT DOCUMENTS

| | | | |
|---|---|---|---|
| 2016/0026927 A1 | 1/2016 | Bhattacharjya et al. | |
| 2016/0155053 A1 | 6/2016 | Deleris et al. | |
| 2016/0188757 A1* | 6/2016 | Gonzalez-Banos | G06F 17/11 |
| | | | 703/1 |
| 2016/0306725 A1* | 10/2016 | Hare | G06F 11/07 |
| 2016/0306899 A1 | 10/2016 | Amid et al. | |
| 2016/0328655 A1 | 11/2016 | Adams et al. | |
| 2017/0329875 A1* | 11/2017 | Detwiler | G06Q 10/06 |
| 2019/0171187 A1* | 6/2019 | Cella | G06N 3/126 |

OTHER PUBLICATIONS

Ai, Jing, and Alhussein A. Abouzeid. "Coverage by directional sensors in randomly deployed wireless sensor networks." Journal of Combinatorial Optimization 11 (2006): 21-41. (Year: 2006).*

Liu, Liang, Xi Zhang, and Huadong Ma. "Optimal node selection for target localization in wireless camera sensor networks." IEEE Transactions on vehicular technology 59.7 (2009): 3562-3576. (Year: 2009).*

Golovin, Daniel, Matthew Faulkner, and Andreas Krause. "Online distributed sensor selection." Proceedings of the 9th ACM/IEEE International Conference on Information Processing in Sensor Networks. 2010. (Year: 2010).*

Hey, Jonathan, Teo Chek Sing, and Tan Jun Liang. "Sensor selection method to accurately model the thermal error in a spindle motor." IEEE Transactions on Industrial Informatics 14.7 (2017): 2925-2931. (Year: 2017).*

Mohamadi, Hosein, Shaharuddin Salleh, and Mohd Norsyarizad Razali. "Heuristic methods to maximize network lifetime in directional sensor networks with adjustable sensing ranges." Journal of network and computer applications 46 (2014): 26-35. (Year: 2014).*

Tekiner et al., "Multi-period multi-objective electricity generation expansion planning problem with Monte-Carlo simulation", Electric Power Systems Research, Dec. 2010, pp. 1394-1405, vol. 80, Issue 12.

Suga et al., "Structural analysis of Pareto-optimal solution sets for multi-objective optimization: An application to outer window design problems using Multiple Objective Genetic Algorithms", Building and Environment, May 2010, pp. 1144-1152, vol. 45, Issue 5.

Gong et al., "Environmental/economic power dispatch using a hybrid multi-objective optimization algorithm", International Journal of Electrical Power & Energy Systems, Jul. 2010, pp. 607-614 vol. 32, Issue 6.

Corne et al., "Techniques for Highly Multiobjective Optimisation: Some Nondominated Points are Better than Others", Proceedings of the 9th annual conference on Genetic and evolutionary computation, 2007, pp. 773-780.

Dror et al., "Set-SMAA for finding preferable multi-objective solutions", Proceedings of the Genetic and Evolutionary Computation Conference Companion, 2017, pp. 149-150.

* cited by examiner

OPTIMIZING COMBINED SENSORY DATA BY UTILITARIAN SELECTION OF A SUBGROUP OF AVAILABLE SENSORS

BACKGROUND

The invention relates to the field of decision analysis.

Multi-criteria decision-making (MCDM) and multi-objective optimization, may be concerned with a human decision-maker (DM) that needs to select an option from a set of possible options, each of which may be ranked based on several criteria (which may be called objectives). For example, an option's score in each criterion may be given by a real number, and that a greater value means that criteria for that option may be better. In typical decision problems, there may be no single option that may be best in all criteria, and there may be a tradeoff between the options. The DM must select the option with the best set of criteria values to reach an informed decision.

An option for which no other option strictly 'dominates' it (that is, at least as good in all criteria, and strictly better in at least one criterion) may be called Pareto efficient. The set of all Pareto-efficient options may be called the Pareto frontier. The Pareto frontier contains all reasonable options to choose from, where there may be a tradeoff between options on the frontier (unless they are identical in terms of most criteria).

Numerous analytical methods may be used to assist the DM in selecting a preferred option. Most of these methods require prior knowledge about the DM, or a means of interaction with the DM in order to determine subjective preferences with regard to the importance of various criteria and the relative advantages of options on the Pareto frontier. Other techniques provide a means to rank options on the frontier, or assess their relative advantages, based on the mathematical structure of the frontier, with no prior information.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for receiving sensory data from at least one physical or virtual sensor. The hardware processor(s) are used for computing a plurality of decision options for configuration of the at least one physical or virtual sensor. The hardware processor(s) are used for computing a plurality of utility functions, and for each utility function: (a) computing a utility value for each decision option, and (b) selecting a first subset of decision options that substantially maximize the computed utility values. The hardware processor(s) are used for selecting at least one cross-function decision option from of the first subsets, wherein the at least one cross-function decision option is included in a substantially maximum number of the first subsets. The hardware processor(s) are used for applying at least one of the at least one cross-function decision options, to at least one physical or virtual sensor.

There is provided, in accordance with an embodiment, a computer program product, the computer program product comprising a non-transitory computer-readable storage medium having program code embodied therewith. The program code is executable by at least one hardware processor to receive sensory data from at least one physical or virtual sensor. The program code is executable by at least one hardware processor to compute a plurality of decision options for configuration of the at least one physical or virtual sensor. The program code is executable by at least one hardware processor to compute a plurality of utility functions, wherein for each utility function: (a) compute a utility value for each decision option, and (b) select a first subset of decision options that substantially maximize the computed utility values. The program code is executable by at least one hardware processor to select at least one of cross-function decision option from of the first subsets, wherein the at least one cross-function decision option is included in a substantially maximum number of the first subsets. The program code is executable by at least one hardware processor to apply at least one of the decision options, to at least one physical or virtual sensor.

There is provided, in accordance with an embodiment, a computerized system comprising at least one hardware processor. The computerized system comprises a non-transitory computer-readable storage medium having program code embodied therewith, the program code executable by the at least one hardware processor to receive sensory data from at least one physical or virtual sensor. The program code is executable by the at least one hardware processor to compute a plurality of decision options for configuration of the at least one physical or virtual sensor. The program code is executable by at least one hardware processor to compute a plurality of utility functions, wherein for each utility function: (a) compute a utility value for each decision option, and (b) select a first subset of decision options that substantially maximize the computed utility values. The program code is executable by at least one hardware processor to select at least one cross-function decision option from of the first subsets, wherein the at least one cross-function decision option is included in a substantially maximum number of the first subsets. The program code is executable by at least one hardware processor to apply at least one of the decision options, to at least one physical or virtual sensor.

In some embodiments, the plurality of utility functions are determined by a pseudorandom utility function generator, wherein each execution of the pseudorandom utility function generator selects at least one random function from a group consisting of a weighted function, a weighted polynomial function, and a weighted power function.

In some embodiments, the selecting is performed using a greedy algorithm that iteratively adds at least one of the plurality of decision options of the first subsets to the at least one cross-function decision option.

In some embodiments, the method further comprises an action of organizing the decision options into groups based on the single values, and wherein the selecting of the first subset is performed on the groups of decision options by selecting at least one decision option of each group.

In some embodiments, each of the plurality of sensors is at least one physical sensor selected from the group consisting of a camera sensor, a radiation sensor, an acoustic sensor, a pressure sensor, a motion sensor, a temperature sensor, a gravity sensor, a moisture sensor, a magnetic sensor, and an electromagnetic sensor.

In some embodiments, each of the plurality of sensors is at least one virtual sensor selected from the group of a network performance sensor, a statistical outcome sensor, a heuristic performance sensor, and a computational sensor.

In some embodiments, each of the plurality of sensors is incorporated in at least one of a module, a system, a computer, and a mobile device.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
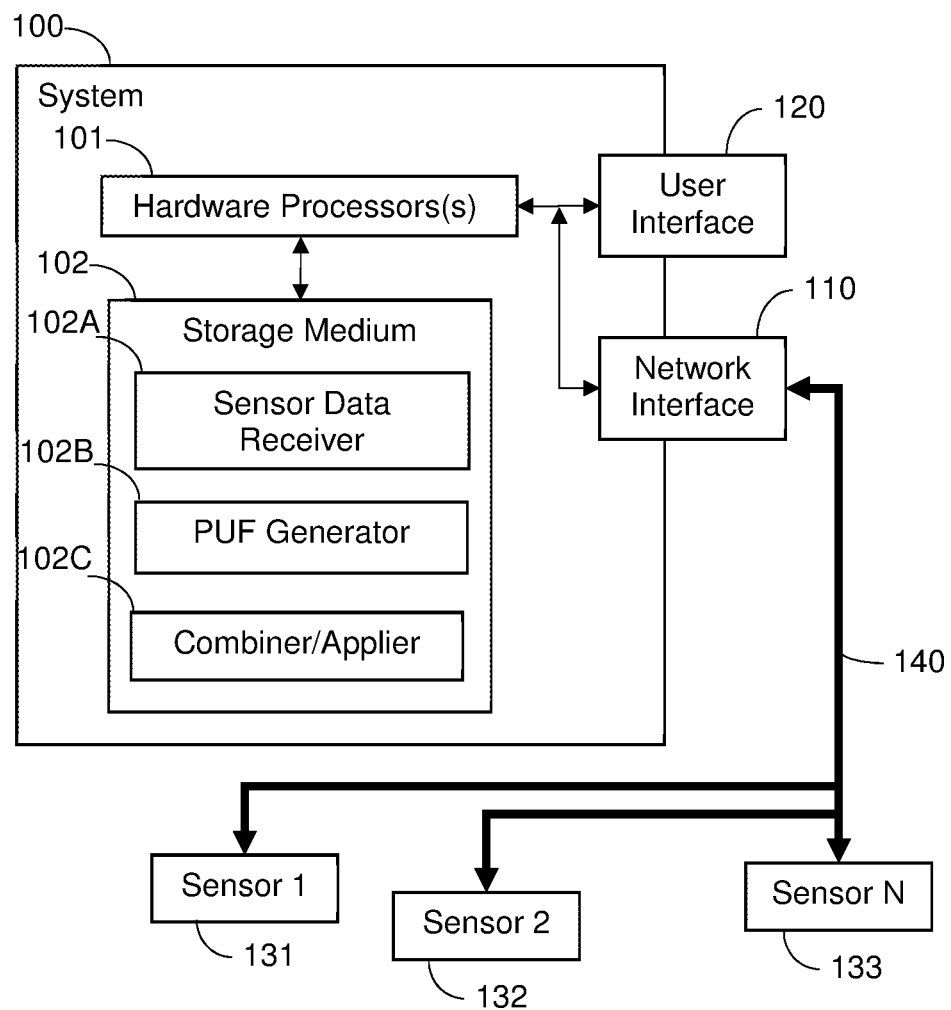
FIG. 1 shows schematically a system for probabilistic decision option selection.

Disclosed herein are systems, methods, and computer program products for automated decision making when a utility function is not fully known. A utility function takes as input a vector of criteria values that represent one of multiple decision options, and computes a single number that captures the overall value, or, utility, of that option for the decision maker (DM). Given the utility function, the reasonable candidates for selection may be the options that maximize the utility function. When the utility function is not known to the DM, multiple utility functions may be automatically computed and/or selected, such as from a library of utility functions, random parametric weighting of utility functions, and/or the like, and the resulting utility values of each option may be automatically combined to estimate the utility value of the unknown utility function (for this option). The utility value may allow automatically selecting one or more of the options as the preferred option (or option set). For example, for each utility function and each decision option, a utility value is computed, and the utility values determine which decision options are selected as a subset for that utility function. For example, the subset are decision options along the Pareto frontier of the utility function. Then, decision options are selected from the first subsets so that a small number of decision options are selected, such as cross-function decision options, to represent as many utility functions as possible (i.e. to cover the utility functions as broadly as possible). For example, a greedy algorithm is used to iteratively add decision options from the subsets to the cross-function decision options until a tolerance is met.

By using different assumptions on the distribution of the utility functions, aspects of embodiments automatically solve the problems of:

Finding a relatively small set of preferable options, given no external information about the preferences of the DM, such as an unknown utility function.

Finding a relatively small set of preferable options, given essentially any level of such external information, such as a partially known utility function.

Ranking of options, and sets of options, given essentially any level of external information, such as a partially known utility function.

The rank of a single option corresponds to the probability that it may be the best choice for the DM (according to a given distribution of utility functions). Similarly, the rank of a set of options corresponds to the probability that one of these options may be best for the DM. This type of ranking serves as a basis for computing preferable options (as mentioned in bullets 1 and 2 above). Optionally, a ranking may be automatically estimated using Monte Carlo simulation. This allows automatically finding preferable options in a way that may be supported rationally.

Following is a practical example of embodiments applied to sensor selection decisions. For example, an application collects raw sensory data from multiple sensors and makes calculations with that data. Each sensor has different characteristics, some of which may change over time, such as weather conditions, maintenance, availability, sensor obstruction, and/or the like. Sensors may publish their characteristics in a predefined format, such as metadata sent with the sensor readings. An example embodiment may establish data connections with a mixture of sensors, each of a different operational quality (i.e. good, bad, sufficient, mixed, . . . ), and may periodically select new sensors, as sensor characteristics change. The problem of how to automate the selection of a good set of sensors may be solved using the techniques disclosed herein.

In this example, n denotes the total number of sensors, which are denoted by the index 1, . . . , n. The total number of characteristics is denoted m, and may be used to rank the sensors. For each sensor $1 \leq k \leq n$, $P_k$ denotes an m-dimensional vector of values, one vector element for each characteristic, corresponding to the $k^{th}$ sensor. A decision problem $D=\{P_1, \ldots, P_n\}$ may be defined and solved using aspects of an embodiment, where the decision is which sensors to choose. When the utility function to select the preferable sensors is unknown, or partially known, PUF generator 102B selects multiple utility functions and computes multiple utility values for each function (e.g. one value for each utility function and each option).

Optionally, the set of resources (i.e. sensors) and their characteristics change over time, and the selection of the sensors is done dynamically.

For example, multiple camera sensors are used to collect image data of a night sky, each sensor sending a digital image with a different size, such as 1024 by 1024, 2048 by 2048, 8192 by 8192, or the like. The sensor images are combined to produce a composite image of the night sky for astronomical research, by selecting from the array of sensors the ones that when combined produce the best image in a reasonable amount of time. The sensors may be distributed over a large area, and due to maintenance, weather conditions, date of installation, each sensor may need different parameters and the list of sensors to use or not use on a particular night may change. Aspects of embodiments described herein may be used to determine which is the most efficient set of sensors and parameters to optimize the image quality of the combined image, the spectral range, the processing time needed to combine the images from individual sensors, and/or the like.

For example, a similar application may combine camera sensors and range finders, depth sensors, and/or the like, for driving an autonomous vehicle.

For example, a similar application may combine camera sensors and motion detectors, door/window sensors, and/or the like, for a security system. Selecting the best set of sensors may allow detecting a security situation with more specificity and sensitivity, thereby avoiding false alarms and/or missed alarms.

For example, multiple radiation sensors may be used for detecting leaks in a nuclear power plant. For example, multiple acoustic sensors may be used for detecting breathing problems in a patient. For example, multiple pressure sensors may be used for detecting leaks in a pipe system, such as a water supply. Other sensor types may include temperature sensors, gravity sensors, moisture sensors, magnetic sensors, and/or the like. Each application may use different combinations of sensors.

Optionally, other types of physical measurement sensors are used individually or in combination. For example, nodes of a physical sensor network each comprise multiple sensors of different types, and the embodiments determine how to select and combine the data from the different sensors and nodes to determine preferable outcome sensor measurements.

Optionally, the multivariate data is from a virtual sensor, such as a network performance sensor, a statistical outcome sensor, a heuristic performance sensor, a graphics processing outcome sensor, a mathematical processor outcome sensor, and/or the like.

Reference is now made to FIG. 1, which shows schematically a system 100 for probabilistic decision option selection. System 100 comprises one or more hardware processors 101, a storage medium 102, such as a non-transitory computer-readable storage medium, a user interface 120, and a network interface 110. Network interface uses a network 140, such as the Internet, to connect to two or more sensors 131, 132, and 133. Storage medium comprises program code, such as in function modules, that may be roughly divided into a sensor data receiver 102A, a pseudorandom utility function (PUF) generator 102B, and a combiner/applier 102C to combine utility function values for different decision options and apply one or more decision options to the sensor network 131, 132, and 133. The application of the one or more selected options allows further operation of the sensor network according to the decision allowed by the PUF generator.

Figure 2:
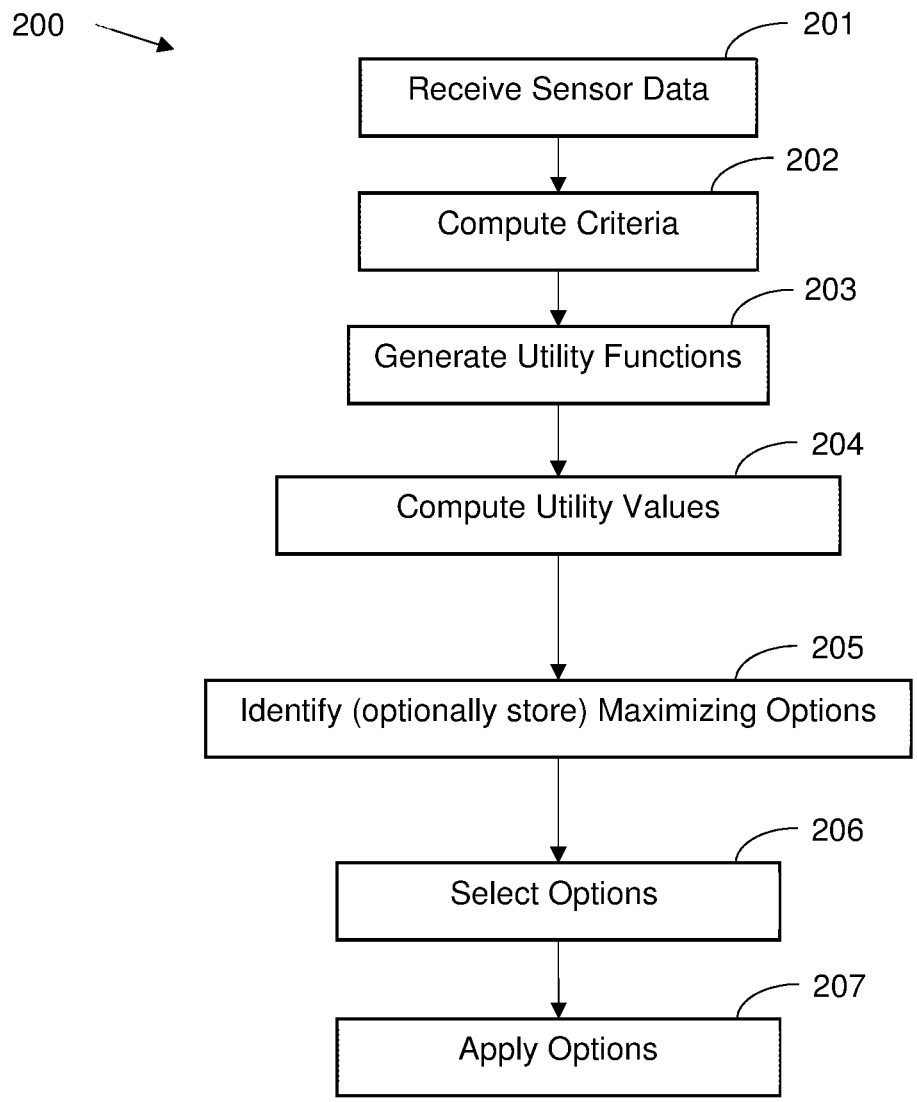
FIG. 2 shows a flowchart of a method for probabilistic decision option selection.

Reference is now made to FIG. 2, which shows a flowchart of a method 200 for probabilistic decision option selection. Method 200 comprises an action of receiving 201 sensor data, such as options data, criteria data, sensor measurements data, and/or the like. Criteria data may be computed 202 from the sensor data, for example by sensor data receiver 102A or PUF generator 102B. Multiple utility functions are generated 203, for example by PUF generator 102B. For example, 1000 utility functions are generated 203 by PUF generator 102B. For each utility function, the utility function values are computed 204 for each option, and those options that approximately maximize the function are identified and optionally stored 205; they are said to cover the function. The identified options, such as the stored record, may be used to select 206 one or more preferable options—the preferable set of options is selected so as to cover as many utility functions as possible. The selected options may be applied 207 to the sensor network either automatically or with approval by a DM.

A multi-criteria decision problem, may be represented by a multivariate dataset. Given a set of n options (denoted by $[n]=\{1, \ldots, n\}$, where $n \geq 0$), and m criteria (denoted by $[m]=\{1, \ldots, m\}$, where $m \geq 1$), a decision problem is given by $D=\{P_k\}_{k=1}^n \subseteq \mathbb{R}^m$. That is, to each option $k \in [n]$ there corresponds a criteria data vector $P_k \in \mathbb{R}^m$ in the m-dimensional space, which represents the ranking of k in each of the criteria: for each criterion $i \in [m]$, the rank of k in i is given by $P_k^i \in \mathbb{R}$. Without loss of generality, we assume here that larger values represent preferable options.

Given criteria data vectors P, $Q \in \mathbb{R}^m$, we say that P is dominated by Q (denoted by $P \preccurlyeq Q$) when $P^i \leq Q^i$ in all criteria $i \in [m]$. We say that P is strictly-dominated by Q (denoted by $P \prec Q$), when $P \leq Q$ and $P \neq Q$. Dominance reflects an improvement in some (or all) of the criteria ranking values. This definition, of course, applies to the options as well. Given options k, $l \in [n]$, we say that k is dominated by l (denoted by $k \preccurlyeq l$) when $P_k \leq P_l$, and that k is strictly-dominated by l (denoted by $k \prec l$) when $P_k < P_l$.

It may be possible that given criteria value vectors P, $Q \in \mathbb{R}^m$ (or, options k, $l \in [n]$) no vector (resp., option) dominates the other; in this case, we say that there is a tradeoff between the points (resp., options). The main difficulty in MCDM occurs when criteria may be conflicting, and options may contain tradeoffs. An option $k \in [n]$ is Pareto efficient when there is no option $l \in [n]$ such that $k \prec l$. The set of all Pareto-efficient options may be called the Pareto frontier of D, and denoted by F (D).

A utility function for a given criteria may be a function $f: \mathbb{R}^m \to \mathbb{R}$ that is monotonically nondecreasing with respect to the dominance relation; i.e., for all data points P, $Q \in \mathbb{R}^m$, when $P \leq Q$ then $f(P) \leq f(Q)$. A utility function may be an explicit representation of the preferences of the DM. For each point $P \in \mathbb{R}^m$, the value $f(P)$ represents the overall value (namely, the utility) of P for the DM. Here also, greater values may be considered better decision options. Monotonicity reflects the fact that an improvement in some (or all) of the criteria can only improve the utility.

When given a utility function $f$, the best options may be those that maximize $f$; i.e., the solutions of maximize $_{k \in [n]} f(P_k)$. Sometimes, however, maximizing the utility up to an additive (alternatively, multiplicative) marginal value $\varepsilon \geq 0$ may be of interest; that is, the options $k \in [n]$ such that $f(P_k) \geq (M-\varepsilon)$ may be of interest, where $M = \max_{k \in [n]} f(P_k)$. Such an option may be said to $\varepsilon$-cover $f$, or simply, cover $f$ (when $\varepsilon$ is fixed).

When the distribution of utility functions is known for the decision, a (usually, small) set S of options that may be considered preferable are selected—in the sense that it may be most likely that one of the options in S may be the best option for the DM. Optionally, S is between 2 and 15, and may be any integer within this range, or any sub-range within this range; each possibility is a separate embodiment of the present invention. The problem may be to determine the appropriate set of utility functions, and the proper distribution over this set which may depend on the information that we have about the domain, the decision-makers in the domain, or a particular DM.

Consider a pre-determined distribution of utility functions; that is, a set U of utility functions, a set of events $E \subseteq 2^U$ (a σ-algebra of subsets of U), and a probability measure $\square: E \to [0, 1]$ assigning probabilities to the events. Also, assume a given pseudorandom generator G( ) of utility functions: each invocation of procedure G( ) returns a computer representation of a utility function $f(x_1, \ldots, x_m)$ in accordance to the distribution at hand. For example, uniformly sampling a point on the standard simplex serves as random weights for linear utility functions or non-linear utility functions (for example, where each term is raised to the power of some number). Other examples include non-uniform sampling on the simplex, selecting values for the weights, and/or the like expressions that are monotonic.

In order to rank certain sets of options, G( ) may be used to generate a large number N of utility functions. Optionally, L is between 10 and 1000, and may be any integer within this range or any sub-range within this range; each possibility is a separate embodiment of the present invention. We may fix $\varepsilon \geq 0$, and for each utility function $f_j$ that is generated, finding the set of options that ($\varepsilon$-) cover $f_j$. More specifically, $M = \max_{k \in [n]} f_j(P_k)$ may be calculated, and for each option $k \in [n]$ such that $f_j(P_k) \geq (M-\varepsilon)$, and j may be added to a set $U_k$ containing all the indices of the utility functions that option k covers.

We call the family of sets $\{U_k\}_{k=1}^n$—which record the functions that each option covers—the coverage database (CDB). The CDB can be used for the ranking of options, as follows. For each set of options $S \subseteq [n]$, we define a coverage measure by:

$$v(S) = \frac{|\bigcup_{k \in S} U_k|}{N}, \qquad \text{EQN. 1}$$

which may be calculated by performing a sequence of set-unions, taking the size of the resulting set, and plugging it into EQN. 1. The coverage measure indicates the fraction of utility functions, among the ones generated, that at least one option in S covers. The measure $v(\cdot)$ may be used to provide a ranking of any number of options, and determine their total significance for the DM given the distribution at hand. This particularly applies to single options.

Beyond calculating the coverage measure of certain sets of options, one may use the coverage measure to find a preferable set of options. Calculating a set of preferable options involves limiting the size of the set.

Optionally, the method includes finding a preferable set of options by maximizing the coverage measure in the objective function of a combinatorial optimization problem of the form: maximize $v(S)$ subject to: $S \subseteq [n]$, $C(|S|)$, where $C(|S|)$ represents additional constraints that limit the size of S, such as putting a size limit in the form of $|S| \leq n_0$ (where $0 \leq n_0 \leq n$).

Optionally, the method includes finding a preferable set by minimizing $|S|$ to obtain the smallest set possible, subject to $S \subseteq [n]$, $v(S) \geq v_0$, where $v_0 \in [0, 1]$ is a fixed coverage threshold.

Optionally, the objective function, or the constraint(s), contains a formulation of both $v(S)$ and $|S|$. For instance, instead of putting a hard limit on the size of S, one may incorporate both '$v(S)$' and '$|S|$' into a single formula. Moreover, the objective function may be supplemented with other elements, such as other formulas, other constraints, and/or the like.

A naïve approach of constructing a solution S* by collecting the top options in accordance to the size of $U_k$ may be limited, as these sets may not be disjoint. This may be because given a utility function $f$, different points (and different options) may yield the same value, and because, as the parameter E may be set to greater values, more options may cover $f$. Nevertheless, the naïve heuristic may be computationally fast.

Optionally, the method includes using a greedy algorithm to calculate preferable options using the CDB and the coverage measure. The results may be a set S that approximates the optimal solution of a combinatorial optimization problem while avoiding high computational times.

Starting with $S_0 = \emptyset$, a sequence of sets of options $S_0, S_1, \ldots, S_T$ may be iteratively constructed, such that in any iteration $i \geq 0$, $S_{i+1}$ may be calculated by adding a single option to $S_i$—the one that contributes most to the functions that are covered by options in $S_i$ (namely, $\bigcup_{k \in S_i} U_k$). More formally, in each iteration we add an option $l \in [n] \setminus S_i$ that maximizes $|U_l \setminus \bigcup_{k \in S_i} U_k|$ (as long as the latter is nonzero). Optionally, the CDB may be iteratively updated: in each iteration $i \geq 0$, an option $l \in [n]$ may be chosen with the largest $U_l$ (when the latter may be nonempty), and then the CDB is updated with $U_k \leftarrow U_k \setminus U_l$ for all $k \in [n]$, and l is added to $S_i$ to obtain $S_{i+1} = S_i \cup \{l\}$.

As there may be a finite number of options (and a finite number of utility functions), the iterative process stops when $v(S_T) = 1$ (assuming $n \geq 1$). The greedy approach optimizes a single step of the construction, but it may not be globally optimal. Specifically, there might be smaller sets with coverage measure 1. Various termination conditions may be imposed to refrain from adding too many options. Putting a hard limit on the size of $S_T$ in the form of $|S_T| \leq n_0$ limits the number of iterations (as $|S_i| = i$ for all $0 \leq i \leq T$). Optionally, the iterations may be terminated when in iteration i, the marginal contribution of option $l \in [n]$ (that was chosen) to the total cover may be below a certain threshold $\delta > 0$; i.e., $$\frac{|U_l|}{N} < \delta$$

(using the notation of the second formulation of the algorithm, which includes updates to the CDB). The rationale behind this termination condition may be that the marginal contribution may be nonincreasing.

The above formulation supports any distribution of utility functions (U, E, $\square$) and uses a pseudorandom generator G( ) of utility functions. This may allow flexible support of a wide range of use cases in which there may be some, but not all, domain-specific or DM-specific information. Furthermore, these techniques may be beneficial when such information is not available.

When no information about the distribution of decision-makers' utility functions is available, a default distribution may be selected that supports a range of preferences of decision makers, and which may not favor one criterion over another. This allows calculating a set of options that may be strong and preferable from a 'neutral' point of view.

For computing a set of utility functions, a simple class of functions may be chosen for describing preferences in the face of multiple criteria, such as a set of linear weighted sums, which may be denoted by $U_{lin}$. To define this set, consider the m-dimensional simplex, which contains vectors of weights, defined by:

$$\mathbb{S}^m = \left\{ w \in \mathbb{R}^m : w_i \geq 0 \text{ for all } i \in [m], \sum_{i=1}^m w_i = 1 \right\}, \qquad \text{EQN. 2}$$

Then, define $U_{lin} = \{w^T x : w \in \mathbb{S}^m\}$, where $w^T x$ denotes the function assigning $w^T x = \sum_{i=1}^m w_i x_i \in \mathbb{R}$ to each $x_i \in \mathbb{R}^m$.

The simplex allows constructing natural distributions, as there may be a one-to-one correspondence between $U_{lin}$ and $\mathbb{S}^m$, a distribution on $U_{lin}$ may be essentially a distribution on $\mathbb{S}^m$, and vice versa. Accordingly, a random generator G( ) for the utility space generates weight vectors on the simplex.

When there is no indication of preference of a certain part of the utility space over another, the uniform distribution on the simplex, denoted by ($\mathbb{S}$, B, $\square_{uni}$), may be modeled. Mathematically, this is the symmetric Dirichlet distribution with $\alpha = 1$, so that a random generator on the simplex may be readily available. This may complete the definition of (U, E, □), such as (U, E, □)=($U_{lin}$, B, $□_{uni}$), and may provide an effective means to compute G( ).

The distribution ($U_{lin}$, B, $□_{uni}$) is symmetric with respect to all m dimensions. However, in order for this symmetry to have the desired effect on the criteria, the values of each of the criteria should better be in the same range. Therefore, considering our decision problem D={$P_k$}$_{k=1}^n \subseteq \mathbb{R}^m$, the criteria values may be in the range of [0, 1]. When this is not the case, D should be normalized.

Consider the (symmetric) linear utility function $f(x_1, x_2)=½x_1+½x_2$ (given m=2), where $f$ doesn't favor one of the criteria over the other, nor favor any distribution of the values of the criteria (as long as the sum of the values remains constant); e.g., $f(0.5, 0.5)=f(0, 1)=f(1, 0)=0.5$. When calculating preferable options, a tendency toward more balanced options may be incorporated. To this end, a family of utility spaces may be defined, each of which may be denoted by $U_\alpha$ (where $\alpha \geq 1$) and termed a-root weighted sums, as follows:

$$U_\alpha = \{w^T x^{1/\alpha} : w \in \mathbb{S}^m\}, \quad \text{EQN. 3}$$

where $w^T x^{1/\alpha}$ denotes the function assigning $w^T x^{1/\alpha} \Sigma_{i=1}^m w_i (x_i^{1/\alpha}) \in \mathbb{R}$ to each $x \in \mathbb{R}^m$. Note that $U_1 = U_{lin}$.

For each $\alpha > 1$, the functions of $U_\alpha$ embody some inclination toward balanced options, which can be understood from the decreasing slope of $1/\alpha$ the function $t \to t^{1/\alpha}$ (for $t \in [0, 1]$). For instance, considering $U_2$ and the square-root weighted sum $\hat{f}(x_1, x_2)=½\sqrt{x_1}+½\sqrt{x_2}$ (given m=2), $\hat{f}(0.5, 0.5) \approx 0.707 > 0.5 = \hat{f}(0, 1) = \hat{f}(1, 0)$. This inclination strengthens as $\alpha$ increases. In the above, one may replace $U_{lin}$ with any $U_\alpha$ while still adhering to a uniform distribution on the simplex. This results in a utility distribution of ($U_\alpha$, B, $□_{uni}$). Other sets of functions may also apply.

Instead of uniformly sampling the simplex using a pseudorandom generator G0, as done as part of the construction of CDB, one may sample the simplex using a uniform grid. This turns the stochastic sampling process into a deterministic process in which one selects the points on a well-defined, evenly spaced, grid. For a given integer granularity parameter $K \geq 1$, a uniform grid on the simplex can be defined by:

$$\mathcal{G}_K^m = \left\{ \frac{1}{K}(n_1, \ldots, n_m) : n_i \in \mathbb{N}_0 \text{ for all } i \in [m], \sum_{i=1}^m n_i = K \right\}, \quad \text{EQN. 4}$$

where $□_0$ denotes the set of nonnegative integers. It can be calculated in several ways; e.g., by going over all points in $\{0, 1, \ldots, K\}^m \subseteq \mathbb{R}^m$ and selecting those that some up to K, or, more efficiently, by going over all possible values $n_1=0, 1, \ldots, K$, and for each of these continue by recursion to a lower dimension using a new parameter $K'=K-n_1$.

Various types of information related to the preferences of the DM can be incorporated into the model. This allows ranking and calculating preferable points under concrete assumptions. After the assumptions are translated into an appropriate distribution of utility functions, and a pseudorandom function generator for this distribution is provided, the problem may be solved using the methods and algorithms described above.

Techniques for ranking options on the Pareto frontier without external knowledge, may consider the mathematical structure of the frontier, and define a measure of some kind, which generally correlates with the magnitude of criteria values. However, existing methods may not be tied to user preferences either partially or fully. One benefit of the disclosed approach may be rigorously justify a solution on the basis of user preferences, using probabilistic considerations, even when they may be unknown. This may improve the quality of the ranking and provide a justification for the preferred solution. Many of the present methods may not be easily extended to the concept of ranking sets of options—so as to provide a strong portfolio of options.

Optionally, average ranking (AR), maximum ranking (MR), sum of ratios (SR) and the like may be incorporated in the disclosed techniques, or used alternatively. SR may calculate for each option a score that may be equal to the average of the values of the criteria, where the values in each criterion may be normalized in the range of [0, 1]. Average ranking may take the average of the ranks (i.e., $1^{st}$ $2^{nd}$, etc.) of criteria values, where lower scores may be preferable. MR may take the best rank instead of the average rank. Although these methods may be simple, a certain level of arbitrariness is included in deciding between them. Moreover, these methods may be challenging to extend for the ranking of sets of options in a way that also takes into account the diversity of the options.

Another method for ranking options on the Pareto frontier may be the favor relation. Instead of calculating a score for each option, a binary relation may be defined on the set of options. An option k may be said to be favored over another l when there are (strictly) more criteria in which k is better than l, than criteria in which l is better than k. One problem in this approach may be that the favor relation may not be transitive—there may be examples in which k may be favored over l, and l may be favored over p, but k may be not favored over p. There may be constructions allowing to turn the ranking into a (transitive) partial ordering, but this offers a partial solution to the problem.

A k-optimality technique may be used, where an option is said to be z-efficient when it is on the frontier and remains on the frontier when it is reduced to any subset of z criteria (which generally reduces the size of the frontier). The order of optimality of an option may be defined to be the least such z. This method may yield a ranking whose granularity (number of levels) is limited by the number of criteria, and it may be not clear how to appropriately extend this method to a set of options. Moreover, the k-optimality may not take actual values into consideration, and there may be examples where it does not capture what appears to be significant differences in the strength of options.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of sensor processing, the method comprising:
   receiving metadata from a group of physical sensors, wherein
   the metadata comprises multiple characteristics of each respective physical sensor of the group of physical sensors, and
   the group of physical sensors forms a sensor network;
   computing a plurality of different possible subgroups of physical sensors from the group of physical sensors;
   in response to detecting that a utility function to select preferable sensors from the group of physical sensors is at least partially unknown, computing a plurality of utility functions by a pseudorandom utility function generator, wherein each utility function of the plurality of utility functions is monotonically nondecreasing with respect to a dominance relation, the pseudorandom utility function generator selects at least one random function from a weighted function, a weighted polynomial function, or a weighted power function, and for each utility function of the plurality of utility functions:

computing a utility value for each of the plurality of different possible subgroups of physical sensors based on utility values of the multiple characteristics of the each respective physical sensor, and identifying a first subset of multiple ones of the plurality of different possible subgroups of physical sensors, wherein the multiple ones of the plurality of different possible subgroups of physical sensors maximize the computed utility value;

controlling execution of a greedy algorithm to iteratively add at least one of the plurality of different possible subgroups of physical sensors of the first subset to at least one cross-function subgroup of physical sensors until a tolerance is reached;

selecting, based on the control of the execution of the greedy algorithm, the at least one cross-function subgroup of physical sensors associated with a cross-function decision option that maximizes multiple computed utility values from the plurality of different possible subgroups of physical sensors of the first subset, wherein respective ones of the multiple computed utility values are directed to a distinct utility function of the plurality of utility functions, the at least one cross-function subgroup of physical sensors is included in a maximum number of the plurality of different possible subgroups of physical sensors of the first subset, and the multiple computed utility values include the computed utility value;

selecting one subgroup of the plurality of different possible subgroups of physical sensors, based on the selected at least one cross-function subgroup of physical sensors;

collecting sensory data only from the physical sensors in the selected one subgroup, and combining the collected sensory data into a combined sensory datum;

controlling, based on the combined sensory datum, the selected one subgroup of physical sensors in the sensor network to at least one of control a vehicle, detect a security condition in a security network, detect a health condition, or detect an anomaly in a specific system;

repeating each of the reception of the metadata, the computation of the plurality of different possible subgroups of physical sensors, the computation of the plurality of utility functions, the selection of the at least one cross-function subgroup of physical sensors, the selection of the one subgroup, the collection of the sensory data, and the control of the selected one subgroup for different points in time based on a change in at least one of the multiple characteristics of each of the group of physical sensors over time, wherein the change is based on environmental conditions associated with the group of physical sensors being different at the different points in time, such that a different subgroup of the different possible subgroups of physical sensors is selected in the repetition at the different points in time; and for each of the different points in time, execute a calculation at each respective point in time based on the combined sensory datum.

2. The method according to claim 1, wherein each physical sensor of the group of physical sensors is selected from the group consisting of a camera sensor, a radiation sensor, an acoustic sensor, a pressure sensor, a motion sensor, a temperature sensor, a gravity sensor, a moisture sensor, a magnetic sensor, and an electromagnetic sensor.

3. The method according to claim 1, wherein the selection of the one subgroup of the plurality of different possible subgroups of physical sensors is done dynamically.

4. The method according to claim 1, wherein the detection of the security condition in the security network is for prevention of at least one of false alarms or missed alarms, the detection of the anomaly corresponds to at least one of a leak detection in a nuclear power plant or a leak detection in a pipe system, and the detection of the health condition corresponds to a detection of a breathing problem in a patient.

5. A computer program product, the computer program product comprising a non-transitory computer-readable storage medium having program code embodied therewith, the program code executable by at least one hardware processor to, automatically:

receive metadata from a group of physical sensors, wherein the metadata comprises multiple characteristics of each respective physical sensor of the group of physical sensors, and the group of physical sensors forms a sensor network;

compute a plurality of different possible subgroups of physical sensors from the group of physical sensors;

in response to detecting that a utility function to select preferable sensors from the group of physical sensors is at least partially unknown, compute a plurality of utility functions by a pseudorandom utility function generator, wherein each utility function of the plurality of utility functions is monotonically nondecreasing with respect to a dominance relation, the pseudorandom utility function generator selects at least one random function from a weighted function, a weighted polynomial function, or a weighted power function, and for each utility function of the plurality of utility functions:

compute a utility value for each of the plurality of different possible subgroups of physical sensors based on utility values of the multiple characteristics of the each respective physical sensor, and identify a first subset of multiple ones of the plurality of different possible subgroups of physical sensors, wherein the multiple ones of the plurality of different possible subgroups of physical sensors maximize the computed utility value;

control execution of a greedy algorithm to iteratively add at least one of the plurality of different possible subgroups of physical sensors of the first subset to at least one cross-function subgroup of physical sensors until a tolerance is reached;

select, based on the control of the execution of the greedy algorithm, the at least one cross-function subgroup of physical sensors associated with a cross-function decision option that maximizes multiple computed utility values from the plurality of different possible subgroups of physical sensors of the first subset, wherein respective ones of the multiple computed utility values are directed to a distinct utility function of the plurality of utility functions, the at least one cross-function subgroup of physical sensors is included in a maximum number of the plurality of different possible subgroups of physical sensors of the first subset, and the multiple computed utility values include the computed utility value;

select one subgroup of the plurality of different possible subgroups of physical sensors, based on the selected at least one cross-function subgroup of physical sensors;

collect sensory data only from the physical sensors in the selected one subgroup, and combining the collected sensory data into a combined sensory datum;

control, based on the combined sensory datum, the selected one subgroup of physical sensors in the sensor network to at least one of control a vehicle, detect a security condition in a security network, detect a health condition, or detect an anomaly in a specific system;

repeat each of the reception of the metadata, the computation of the plurality of different possible subgroups of physical sensors, the computation of the plurality of utility functions, the selection of the at least one cross-function subgroup of physical sensors, the selection of the one subgroup, the collection of the sensory data, and the control of the selected one subgroup for different points in time based on a change in at least one of the multiple characteristics of each of the group of physical sensors over time, wherein the change is based on environmental conditions associated with the group of physical sensors being different at the different points in time, such that a different subgroup of the different possible subgroups of physical sensors is selected in the repetition at the different points in time; and for each of the different points in time, execute a calculation at each respective point in time based on the combined sensory datum.

6. The computer program product according to claim 5, wherein each physical sensor of the group of physical sensors is selected from the group consisting of a camera sensor, a radiation sensor, an acoustic sensor, a pressure sensor, a motion sensor, a temperature sensor, a gravity sensor, a moisture sensor, a magnetic sensor, and an electromagnetic sensor.

7. The computer program product according to claim 5, wherein the selection of the one subgroup of the plurality of different possible subgroups of physical sensors is done dynamically.

8. A computerized system, comprising:
a group of physical sensors;
at least one hardware processor;
a non-transitory computer-readable storage medium having program code embodied therewith, the program code executable by the at least one hardware processor to, automatically:
receive metadata from the group of physical sensors, wherein
the metadata comprises multiple characteristics of each respective physical sensor of the group of physical sensors, and
the group of physical sensors forms a sensor network;
compute a plurality of different possible subgroups of physical sensors from the group of physical sensors;
in response to detecting that a utility function to select preferable sensors from the group of physical sensors is at least partially unknown, compute a plurality of utility functions by a pseudorandom utility function generator, wherein
each utility function of the plurality of utility functions is monotonically nondecreasing with respect to a dominance relation,
the pseudorandom utility function generator selects at least one random function from a weighted function, a weighted polynomial function, or a weighted power function, and for each utility function of the plurality of utility functions:
compute a utility value for each of the plurality of different possible subgroups of physical sensors based on utility values of the multiple characteristics of the each respective physical sensor, and
identify a first subset of multiple ones of the plurality of different possible subgroups of physical sensors, wherein the multiple ones of the plurality of different possible subgroups of physical sensors maximize the computed utility value;
control execution of a greedy algorithm to iteratively add at least one of the plurality of different possible subgroups of physical sensors of the first subset to at least one cross-function subgroup of physical sensors until a tolerance is reached;
select, based on the control of the execution of the greedy algorithm, the at least one cross-function subgroup of physical sensors associated with a cross-function decision option that maximizes multiple computed utility values from the plurality of different possible subgroups of physical sensors of the first subset, wherein
respective ones of the multiple computed utility values are directed to a distinct utility function of the plurality of utility functions,
the at least one cross-function subgroup of physical sensors is included in a maximum number of the plurality of different possible subgroups of physical sensors of the first subset, and the multiple computed utility values include the computed utility value;
select one subgroup of the plurality of different possible subgroups of physical sensors, based on the selected at least one cross-function subgroup of physical sensors;
collect sensory data only from the physical sensors in the selected one subgroup, and combine the collected sensory data into a combined sensory datum;
control, based on the combined sensory datum, the selected one subgroup of physical sensors in the sensor network to at least one of control a vehicle, detect a security condition in a security network, detect a health condition, or detect an anomaly in a specific system;
repeat each of the reception of the metadata, the computation of the plurality of different possible subgroups of physical sensors, the computation of the plurality of utility functions, the selection of the at least one cross-function subgroup of physical sensors, the selection of the one subgroup, the collection of the sensory data, and the control of the selected one subgroup for different points in time based on a change in at least one of the multiple characteristics of each of the group of physical sensors over time, wherein the change is based on environmental conditions associated with the group of physical sensors being different at the different points in time, such that a different subgroup of the different possible subgroups of physical sensors is selected in the repetition at the different points in time; and for each of the different points in time, execute a calculation at each respective point in time based on the combined sensory datum.

9. The computerized system according to claim 8, wherein each physical sensor of the group of physical sensors is selected from the group consisting of a camera sensor, a radiation sensor, an acoustic sensor, a pressure sensor, a motion sensor, a temperature sensor, a gravity sensor, a moisture sensor, a magnetic sensor, and an electromagnetic sensor.

10. The computerized system according to claim 8, wherein the selection of the one subgroup of the plurality of different possible subgroups of physical sensors is done dynamically.

* * * * *